(12) United States Patent
Martin et al.

(10) Patent No.: US 7,301,956 B2
(45) Date of Patent: Nov. 27, 2007

(54) SYSTEM AND METHOD FOR STORING AND RETRIEVING MULTI-SPEED DATA STREAMS WITHIN A NETWORK SWITCH

(75) Inventors: Kreg A. Martin, Los Gatos, CA (US); David C. Banks, Pleasanton, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1052 days.

(21) Appl. No.: 09/972,471

(22) Filed: Oct. 6, 2001

(65) Prior Publication Data

US 2002/0167958 A1    Nov. 14, 2002

Related U.S. Application Data

(60) Provisional application No. 60/290,267, filed on May 10, 2001.

(51) Int. Cl.
*H04L 12/28* (2006.01)
(52) U.S. Cl. ............... 370/413; 370/229; 370/235; 370/428
(58) Field of Classification Search ............... 370/359, 370/363, 368, 378, 395.7
See application file for complete search history.

(56) References Cited

U.S. PATENT DOCUMENTS

| | | | |
|---|---|---|---|
| 4,575,844 A * | 3/1986 | Kosuge et al. ............... 370/354 |
| 5,144,619 A * | 9/1992 | Munter ....................... 370/353 |
| 5,491,801 A | 2/1996 | Jain et al. ............... 395/200.13 |
| 5,727,002 A | 3/1998 | Miller et al. .................. 371/32 |
| 5,841,990 A | 11/1998 | Picazo, Jr. et al. ...... 395/200.79 |
| 5,894,481 A * | 4/1999 | Book ........................ 370/412 |
| 6,049,546 A | 4/2000 | Ramakrishnan ............. 370/412 |
| 6,094,434 A | 7/2000 | Kotzur et al. ............... 370/401 |
| 6,160,813 A | 12/2000 | Banks et al. ................ 370/422 |
| 6,185,203 B1 | 2/2001 | Berman ..................... 370/351 |
| 6,307,852 B1 * | 10/2001 | Fisher et al. ................ 370/352 |
| 6,643,294 B1 * | 11/2003 | Cooperman et al. ........ 370/413 |
| 6,728,242 B2 * | 4/2004 | Sakurai et al. ............. 370/391 |
| 6,804,815 B1 * | 10/2004 | Kerr et al. .................. 718/100 |
| 6,882,799 B1 * | 4/2005 | Beshai et al. ................ 398/45 |
| 6,931,002 B1 * | 8/2005 | Simpkins et al. ........... 370/354 |

* cited by examiner

*Primary Examiner*—Chi Pham
*Assistant Examiner*—Phuc Tran
(74) *Attorney, Agent, or Firm*—Wong, Cabello, Lutsch, Rutherford, & Brucculeri, LLP

(57) ABSTRACT

A system and method for retrieving multi-speed data streams is described. The data streams are stored within a central memory containing a plurality of memory modules. A first embodiment provides for creating multiple timeslots and segments for accessing a memory module within the central memory. A second embodiment provides for buffering data streams to equalize the rate at which all the data streams are stored and retrieved from the central memory. An implementation of the second embodiment is described where unused timeslots are allocated for sending data from a memory module to a transmitting port.

47 Claims, 7 Drawing Sheets

SYSTEM AND METHOD FOR STORING AND RETRIEVING MULTI-SPEED DATA STREAMS WITHIN A NETWORK SWITCH

CROSS REFERENCE TO RELATED APPLICATIONS

This application claims the benefit under 35 U.S.C. § 119(e) of U.S. provisional patent application Ser. No. 60/290,267, entitled "System and Method for Storing and Retrieving Multi-Speed Data Streams Within a Network Switch," by Kreg A. Martin and David C. Banks, filed May 10, 2001, which is hereby incorporated by reference.

BACKGROUND OF THE INVENTION

1. Field of the Invention

The present invention relates to network switching systems and methods for receiving and transmitting data at different speeds. More specifically, the present invention relates to a Fibre Channel switching system and method operable at multiple speeds. Still more specifically, the present invention relates to a Fibre Channel switch that contains a central memory architecture using a barrel striping technique to store and retrieve data, the switch being able to receive and transmit data streams at different rates.

2. Description of the Background Art

The proliferation of bandwidth-hungry users and high-speed multimedia applications has placed a strain on the capacity of most network infrastructures. As technology continues to progress, the demand placed on network infrastructures will continue to increase. For example, recent performance improvements have empowered computers to operate at a much higher speeds and efficiencies. These improvements have spawned ever-increasing data-intensive networking applications. In response to ever increasing network capacity demands, the American National Standards Institute (ANSI) developed an integrated set of standards for quickly transferring data between clients, storage devices and other peripherals. This standard is called the Fibre Channel family of standards.

Fibre Channel attempts to create a new interface that combines aspects of both channel and network technology. Conventional channel technology provides a direct connection from one device to another. Channels generally deliver data at a high rate with low latency and are typically hardware intensive. Channels, however, are not suitable for providing connectivity among many clients and also facilitate small packet bursty-traffic. Comparatively, traditional network technology relates to multiple nodes or clients having associated protocols so that the nodes can communicate with each other. Typically, network technology is software-related and requires high overhead. As a result, network technology is typically slower than channel technology but generally more dynamic.

Fibre Channel is a high-speed serial link supporting multiple protocols. This link facilitates the fast transfer of large amounts of data between two devices. In the past, Fibre Channel has operated at a variety of speeds including: 133 Gbit/s, 266 Gbit/s, 530 Gbit/s, and 1 Gbit/s. However, due to the demand for network bandwidth, the vast majority of current Fibre Channel devices operate at 1 Gbit/s. As a result, a high majority of Fibre Channel networks operate exclusively at 1 Gbit/s (i.e., data transmission rate between switches within the network).

As is the case with traditional networks, Fibre Channel networks also struggle to maintain available network capacity for an increasing bandwidth-hungry user group. The physical expansions of Fibre Channel networks as well as increasingly bandwidth-hungry applications have stretched these networks to their capacity. This increasing demand on Fibre Channel networks resulted from improvements made in a computer device's ability to receive and process data on a network. In turn, higher demand applications were developed that can be executed effectively on these newly improved computer devices. As a result, improvements in the Fibre Channel network's ability to facilitate these new applications on improved computer devices need to be made.

In order to alleviate this network stress, data on the network needs to be transferred at a higher rate. Improvements in both network and channel technology allow Fibre Channel connections to operate at higher rates than the current 1 Gbit/s rate. However, current Fibre Channel switches are only able to operate at a single speed. As discussed previously, this speed is typically 1 Gbit/s. The inability of current Fibre Channel switches to operate above a speed of 1 Gbit/s creates a problem in expanding networks with switches operating at higher speeds.

Currently, Fibre Channel switches are able to effectively function at speeds much quicker than 1 Gbit/s. For example, a 2 Gbit/s switch has been effectively tested and used. However, the two switches are not compatible because of their differing speeds. Therefore, if current technology were used to increase the speed of existing Fibre Channel networks (i.e., install 2 Gbit/s switches), each pre-existing Fibre Channel switch within the network would need to be removed and replaced by the faster switch.

In order to expand current Fibre Channel networks, a network service provider would incur heavy costs. For example, this expansion procedure would be extremely expensive because the existing Fibre Channel switches would no longer be useful and each would need to be replaced by newer models. Also, the procedure would require a large amount of time by network operators to rebuild their networks using the newer model switch. Thus, there is a need for a switching system and method that avoids the need to remove pre-existing switches while at the same time allows faster switches to be installed into the network. This system and method would be compatible with the 1 Gbit/s switch and, at the same time, result in an overall increase in the average speed of the expanded network.

SUMMARY OF THE INVENTION

The described embodiments of the present invention overcome the deficiencies and limitations of the prior art by providing a system and method for switching data streams at multiple speeds. This system may be installed within existing Fibre Channel networks because of its compatibility with the pre-existing switches. In particular, the system and method provides a network switch containing multiple ports operable at a first speed and multiple ports operable at a second speed. The network switch is able to receive and transmit data streams at different rates corresponding to which of these ports is used. As a result, the described network switches may be used to build out existing networks at higher speeds while allowing existing switches within the network to function at slower speeds, thereby increasing the overall speed of the network.

A port on a Fibre Channel switch receives and transmits data at a specific rate. Once a data stream is received, a header is evaluated from a frame contained in the stream and processed. The frame is stored in a memory device contained within the network switch during the time required to process the header information. Using information contained within the header, a destination port is identified for transmitting the stored frame onto the network. After a destination port has been determined for the data stream, the stored frame is read from the memory device and transmitted to a corresponding destination port. Thereafter, the data stream is transmitted onto the network at the rate corresponding to the destination port used to send the data.

A first embodiment of the invention provides a central memory architecture, within the switch, capable of writing and reading data to the memory at different speeds using a barrel striping technique. According to this first embodiment, the central memory is comprised of multiple memory modules. Each port is assigned its own timeslot for accessing each of the memory modules. Simultaneous access to the central memory by ports receiving data at different speeds is possible because each port is accessing a different memory module through a corresponding timeslot during a specific period of time.

Frames within a data stream are stored within the multiple memory modules by using a barrel striping technique. Striping is performed by dividing each data frame into sub-frames and storing each sub-frame within a particular memory module. Preferably, the first sub-frame is stored in a first memory module and the remaining sub-frames are stored in memory modules sequentially accessed in accordance with a timeslot protocol (each port accessing a different memory module during a specific period of time). However, the first sub-frame may be stored in any one of the memory modules and then the remaining sub-frames are stored in subsequent memory modules within the striping cycle.

The timeslot protocol establishes certain accessing periods of time where a port may access a specific memory module to write or retrieve data. These accessing periods of time are defined by creating timeslots relative to a specific number of clock ticks controlled by a timing circuit within the switch. According to a first embodiment of the invention, multiple timeslots are created for each accessing period of time. As a result, multiple ports may access a single memory module within the same accessing period of time.

This timeslot protocol allows data to be striped across the memory modules at different rates. In a typical barrel striping storage technique, if data is striped across multiple memory modules at different speeds, collisions will occur where two different ports try to access the same memory module using the same timeslot. However, by creating multiple timeslots within each accessing period of time, these collisions are avoided. As a result of this first embodiment of the invention, ports may store and retrieve data from the central memory at different rates. Consequently, some ports can receive and transmit data on a network at first rate and other ports can receive and transmit data on a network at a second rate.

A second embodiment of the invention provides a networking switch capable of receiving and transmitting data on a network at different rates, equalizing the rate of the data received at different rates, and accessing a central memory architecture using a barrel striping technique. According to the second embodiment of the invention, data from all of the ports is stored and retrieved in memory modules within the central memory at the same rate. Because each data stream is written to and read from the memory modules at the same rate, there are no collisions that occur between ports trying to access a specific memory module.

In order for the switch to receive data streams from a network at different rates and store these data streams in the central memory at the same rate, the differing rates must all be equalized prior to writing the data in the central memory. According to the second embodiment of the invention, ports receiving data streams at a different rate than the rate at which data is written to the memory, i.e., the lower speed ports, are coupled to FIFO buffers. The FIFO buffers are then coupled to the central memory and given access to the memory modules using the same barrel striping technique described above. As a port receives data, the data is buffered into the FIFO buffer at the same rate at which it was received. Once a determined amount of data has been stored in the FIFO buffer, the data is provided from the FIFO buffer into the central memory using the barrel striping technique described above. In comparison to the first embodiment of the invention, the second embodiment does not require the creation of multiple timeslots for each accessing period of time to avoid collisions because all of the data is being written to the memory modules at the same rate.

As the data is stored in the switch, a destination port is determined using the retrieved header information. In order for the switch to retrieve the data in the central memory at the same rate it was stored and subsequently transmit the data streams onto a network at different rates, the retrieved data must be buffered and its transmission rate adjusted.

According to the second embodiment of the invention, each port transmitting data at a lower rate than the retrieval rate of the central memory is coupled to a FIFO buffer. The buffers are coupled to the central memory and given access to the memory modules in the same manner that the ports access the modules. Each buffer retrieves data stored in the central memory at the same rate at which the data was written to the memory modules using a barrel striping technique described above. After the data is buffered, the transmitting port retrieves the data at its desired rate from the central memory and transmits it onto the network at the rate at which the data was retrieved from the buffer.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

DETAILED DESCRIPTION OF PREFERRED EMBODIMENTS

In the following description, for purposes of explanation, numerous specific details are set forth in order to provide a thorough understanding of the invention. It will be apparent, however, to one skilled in the art that the invention can be practiced without these specific details. In other circumstances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
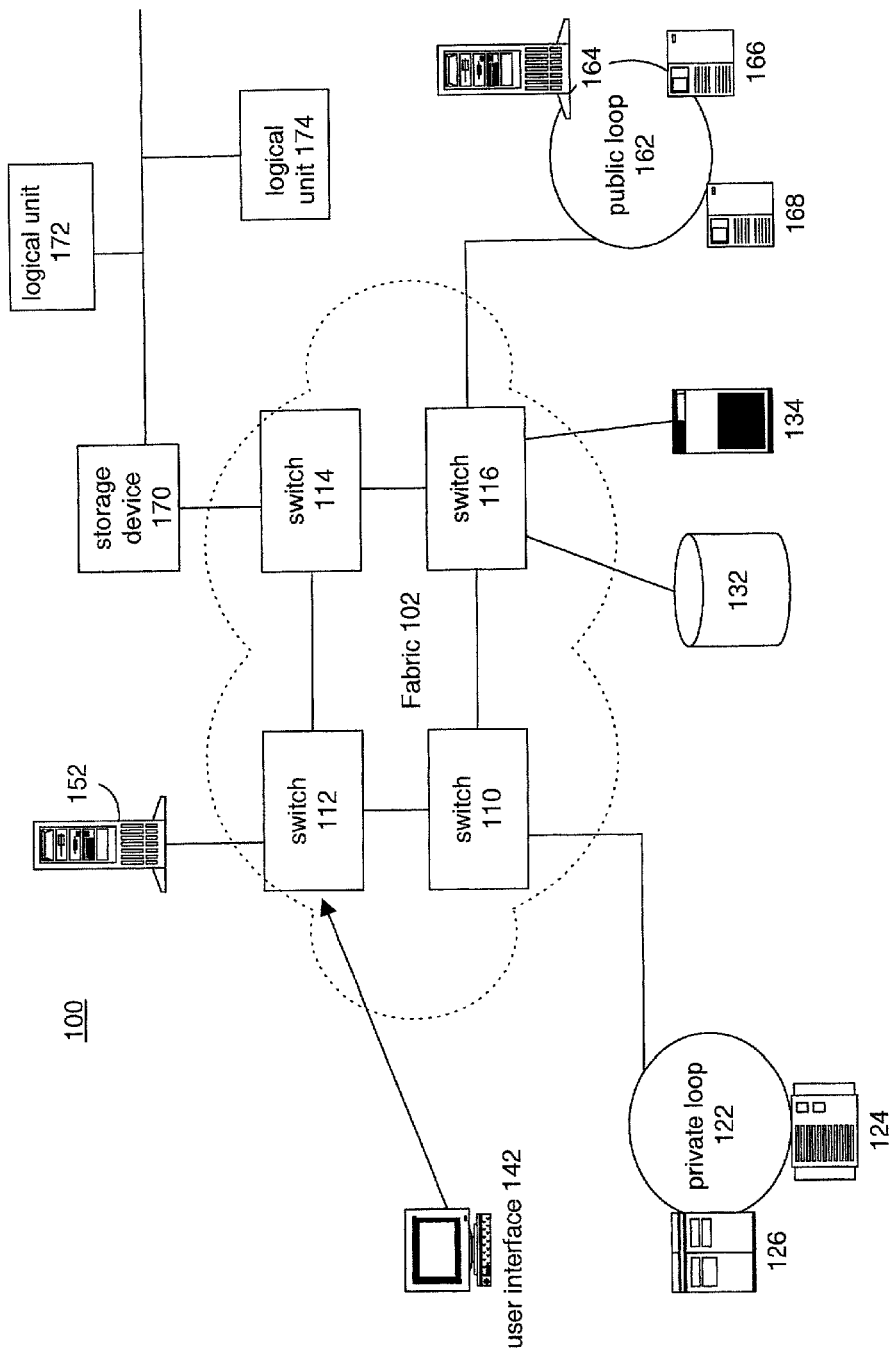
FIG. 1 is a block diagram of a Fibre Channel fabric connecting various devices, with Fibre Channel switches according to the present invention present in the fabric.

FIG. 1 illustrates a Fibre Channel network 100 according to the present invention. Generally, the network 100 is connected using Fibre Channel connections (e.g., optical fiber, coaxial cable, and twisted pair connections). In the embodiment shown and for illustrative purposes, the network 100 includes a fabric 102 comprised of four different switches 110, 112, 114, and 116. It will be understood by one of skill in the art that a Fibre Channel fabric may be comprised of one or more switches.

A variety of devices can be connected to the fabric 102. A Fibre Channel fabric supports both point-to-point and loop device connections. A point-to-point connection is a direct connection between a device and the fabric. A loop connection is a single fabric connection that supports one or more devices in an "arbitrated loop" configuration, wherein signals travel around the loop through each of the loop devices. Hubs, bridges, and other configurations may be added to enhance the connections within an arbitrated loop.

On the fabric side, devices are coupled to the fabric via fabric ports. A fabric port (F_Port) supports a point-to-point fabric attachment. A fabric loop port (FL_Port) supports a fabric loop attachment. Both F_Ports and FL_Ports may be referred to generically as Fx_Ports. Typically, ports connecting one switch to another switch are referred to as expansion ports (E_Ports).

On the device side, each device coupled to a fabric constitutes a node. Each device includes a node port by which it is coupled to the fabric. A port on a device coupled in a point-to-point topology is a node port (N_Port). A port on a device coupled in a loop topology is a node loop port (NL_Port). Both N_Ports and NL_Ports may be referred to generically as Nx_Ports. The label N_Port or NL_Port may be used to identify a device, such as a computer or a peripheral, which is coupled to the fabric.

Loop devices (NL_Ports) coupled to a fabric may be either "public" or "private" devices that comply with the respective Fibre Channel standard (e.g., Fabric Loop Attach standard FC-FLA, or Fibre Channel Private Loop Direct Attach FC-PLDA, respectively). Those skilled in the art will be familiar with the configurations for enabling public and private devices to operate in compliance with ANSI specifications (e.g., X3.272 1996; T11 project 1133-D) and the NCITS specification (e.g., NCITS TR-20 1998; NCITS TR-19 1998).

Typically, private loop devices cannot log into an attached fabric and are thus incapable of communicating with other fabric devices. However, a well-suited method for allowing private loop devices to communicate with public fabric-attached devices is disclosed in commonly assigned U.S. patent application Ser. No. 09/370,095, entitled "System and Method for Sending and Receiving Frames Between a Public Device and a Private Device," by Stai, et al., filed on Aug. 6, 1999, the subject matter of which is herein incorporated by reference in its entirety. In general, private addresses reside at the "end points" of the fabric, and upon entering a loop, frames having the format of the private address are transformed to a format associated with a public address. This implies that there is a representation of private traffic in a public format when a frame navigates through a loop.

In the embodiment shown in FIG. 1, fabric 102 includes switches 110, 112, 114 and 116 that are interconnected. Switch 110 is attached to private loop 122, which is comprised of devices 126 and 124. Switch 112 is attached to device 152. Switch 114 is attached to device 170, which has two logical units 172, 174 attached to device 170. Typically, device 170 is a storage device, which in turn may be coupled to additional individual hard disks represented as logical units (i.e., 172 and 174). Switch 116 is attached to devices 132 and 134, and is also attached to public loop 162, which is formed from devices 164, 166 and 168 being communicatively coupled together. A user interface 142 also connects to the fabric 102 through switch 112.

Figure 2:
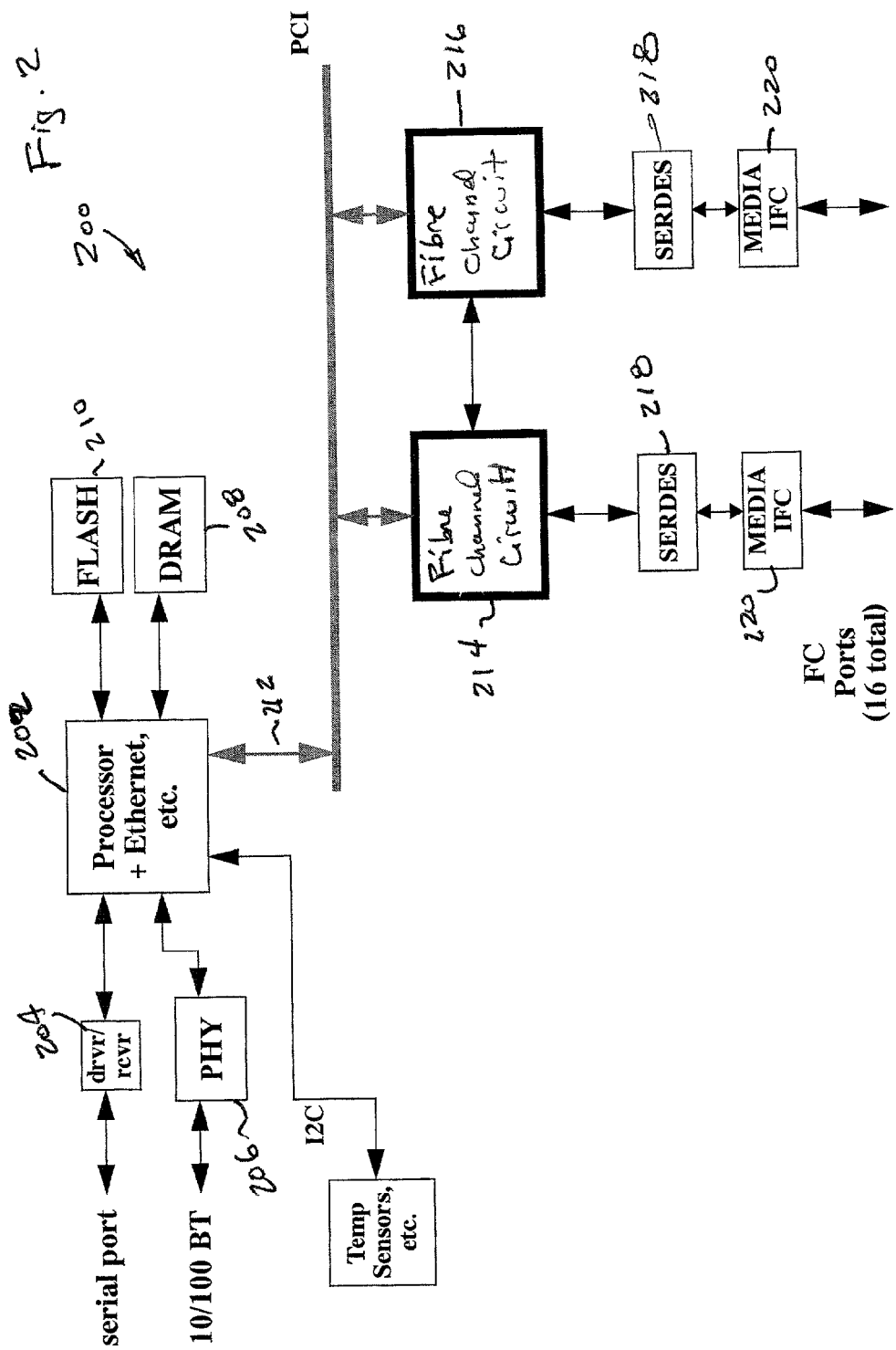
FIG. 2 is a basic block diagram of a Fibre Channel switch in accordance with the present invention.

FIG. 2 illustrates a basic block diagram of a switch 200, such as switches 110, 112, 114 or 116, according to the preferred embodiment of the present invention. A processor and I/O interface complex 202 provides the processing capabilities of the switch 200. The processor may be any of various suitable processors, including the Intel i960 and the Motorola PowerPC. The I/O interfaces may include low speed serial interfaces, such as RS-232, which use a driver/receiver circuit 204, or high-speed serial network interfaces, such as Ethernet, which use a PHY circuit 206 to connect to a local area network (LAN). Main memory or DRAM 208 and flash or permanent memory 210 are connected to the processor complex 202 to provide memory to control and be used by the processor.

The processor complex 202 also includes an I/O bus interface 212, such as PCI bus, to connect to Fibre Channel circuits 214 and 216. The Fibre Channel circuits 214, 216 in the preferred embodiment each contain eight Fibre Channel ports. Each port is connected to an external SERDES circuit 218, which in turn is connected to a media interface 220, which receives the particular Fibre Channel medium used to interconnect switches used to form a fabric or to connect to various devices.

Figure 3:
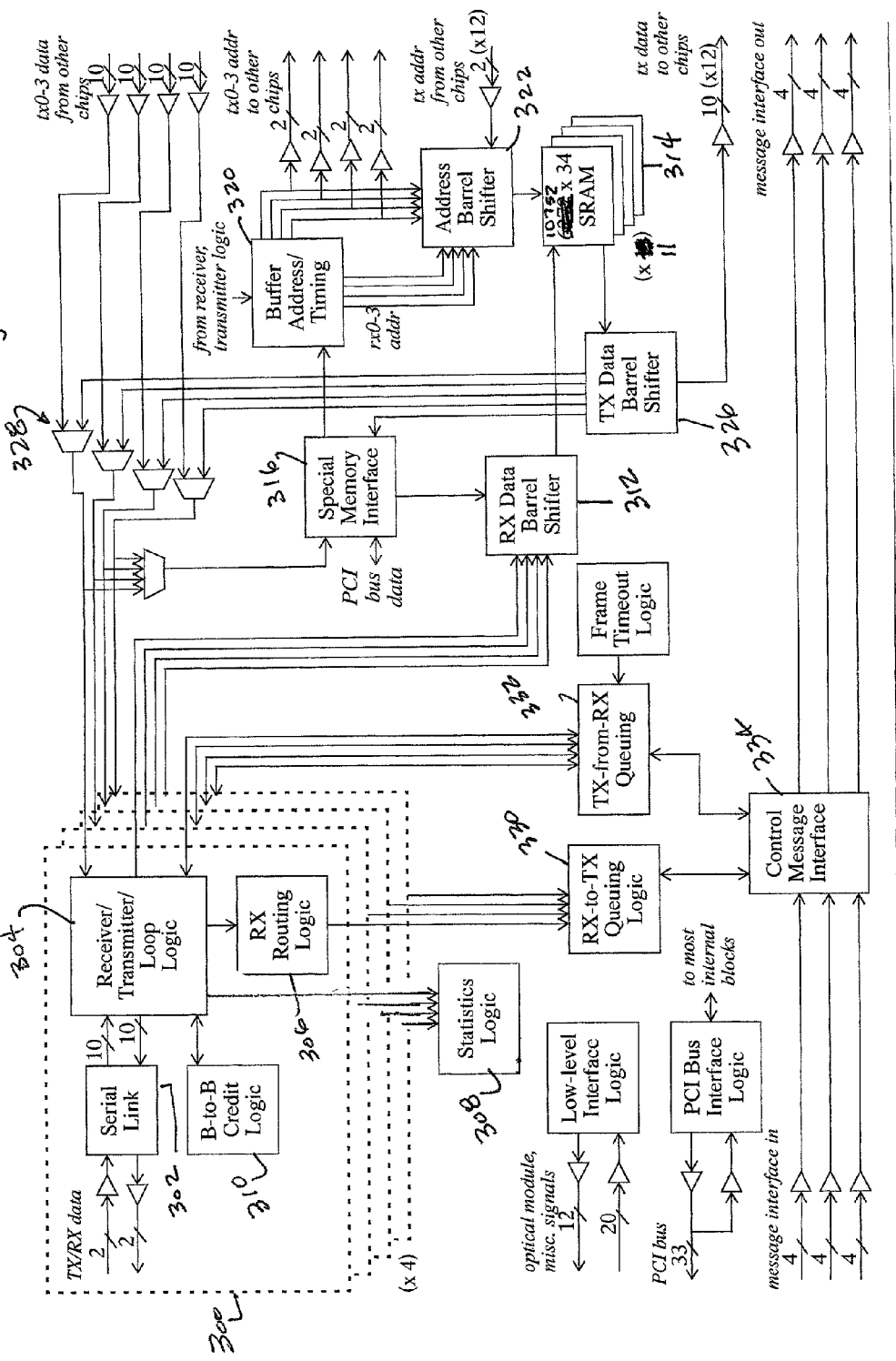
FIG. 3 is a basic block diagram of a portion of the Fibre Channel circuit of FIG. 2.

FIG. 3 illustrates a simplified block diagram of one-half of the preferred embodiment of the Fibre Channel circuits 214 and 216. Thus FIG. 3 is duplicated inside each Fibre Channel circuit 214, 216. Various components serve a similar function as those illustrated and described in U.S. Pat. No. 6,160,813 which is hereby incorporated by reference in its entirety. The preferred embodiment is an improvement of embodiments of U.S. Pat. No. 6,160,813.

Each one-half of Fibre Channel circuit 216, 218 includes four identical receiver/transmitter circuits 300, each circuit 300 having one Fibre Channel port, for a total of four Fibre Channel ports. Each circuit 300 includes a serial link 302, receiver/transmitter logic 304 and receiver (RX) routing logic 306. Certain operations of the receiver/transmitter logic 304 are described in more detail below. The serial link 302 provides the interface between the SERDES circuit 218 and the receiver/transmitter logic 304. The receiver routing logic 306 is used to determine the destination physical ports within the local fabric element of the switch 200 to which received frames are to be routed.

Each receiver/transmitter circuit 300 is also connected to statistics logic 308. Additionally, Buffer-to-Buffer credit logic 310 is provided for determining available transmit credits of virtual channels used on the physical channels.

Received data is provided to a receive barrel shifter or multiplexer 312 used to properly route the data to the proper portion of the central memory 314. The central memory 314 preferably consists of eleven individual SRAMs, preferably each being 10752 words by 34 bits wide. Each individual SRAM is independently addressable, so eleven individual receiver and transmitter sections may be simultaneously accessing the central memory 314. The access to the central memory 314 is time sliced to allow the four receiver ports, sixteen transmitter ports and a special memory interface 316 access every other time slice or clock period. This is illustrated below for the various embodiments.

The receiver/transmitter logic 304 is connected to buffer address/timing circuit 320. This circuit 320 provides properly timed memory addresses for the receiver and transmitter sections to access the central memory 314 and similar central memory in other duplicated blocks in the same or separate Fibre Channel circuits 216, 218. An address barrel shifter 322 receives the addresses from the buffer address/timing circuits 320 and properly provides them to the central memory 314.

A transmit (TX) data barrel shifter or multiplexer 326 is connected to the central memory 314 to receive data and provide it to the proper transmit channel. As described above, several of the blocks of FIG. 3 can be interconnected to form a full eight port circuit or two eight port circuits. Thus transmit data for the four channels illustrated in FIG. 3 may be provided from similar other circuits.

This external data is multiplexed with transmit data from the transmit data barrel shifter 326 by multiplexers 328, which provide their output to the receiver/transmitter logic 304.

In a fashion similar to that described in U.S. Pat. No. 6,160,813, RX-to-TX queuing logic 330, TX-to-RX queuing logic 332 and a central message interface 334 are provided and perform a similar function, and so will not be explained in detail.

In a first embodiment according to the invention, the time slicing of the central memory 304 is further divided logically into two segments for each receive and transmit port. A first or odd segment is provided for high speed or 2.125 Gbits/s operations. A second or even segment is provided for low speed or 1.0625 Gbits/s operations. If a particular port is operating at high speed, it accesses the central memory 314 during the odd segment, while if the port is operating at low speed, it accesses the central memory during the even segment. This is in addition to each port having access to the central memory 314 every two clock cycles in the preferred embodiment. The time slicing of the preferred embodiment is such that each port has access to the central memory 314 at the speed needed to properly store data being received or transmitted at high speed, 2.125 Gbits/s in the preferred embodiment. Thus, if the particular port is operating at full speed, it simply provides the data to the central memory 314 and the timing logic 320 is configured to have the accesses performed at the full rate during the odd segment.

If, however, the particular port is operating at low speed, it cannot receive or transmit at the full speed of the central memory 314. To resolve this problem, the particular port accesses the central memory 314 only every other time slice, during the even segment, thus accessing the central memory 314 at the lower receive or transmit rate of the port. But if the timing logic 320 advanced the addresses at the same rate as during high speed operation, the data would not be properly barrel striped into the central memory 314. To solve this problem the timing logic 320 advances the addresses in the even segment at half the rate as in the odd segment. Thus addresses progress in the same sequence for each segment, but at different speeds.

Figure 4:
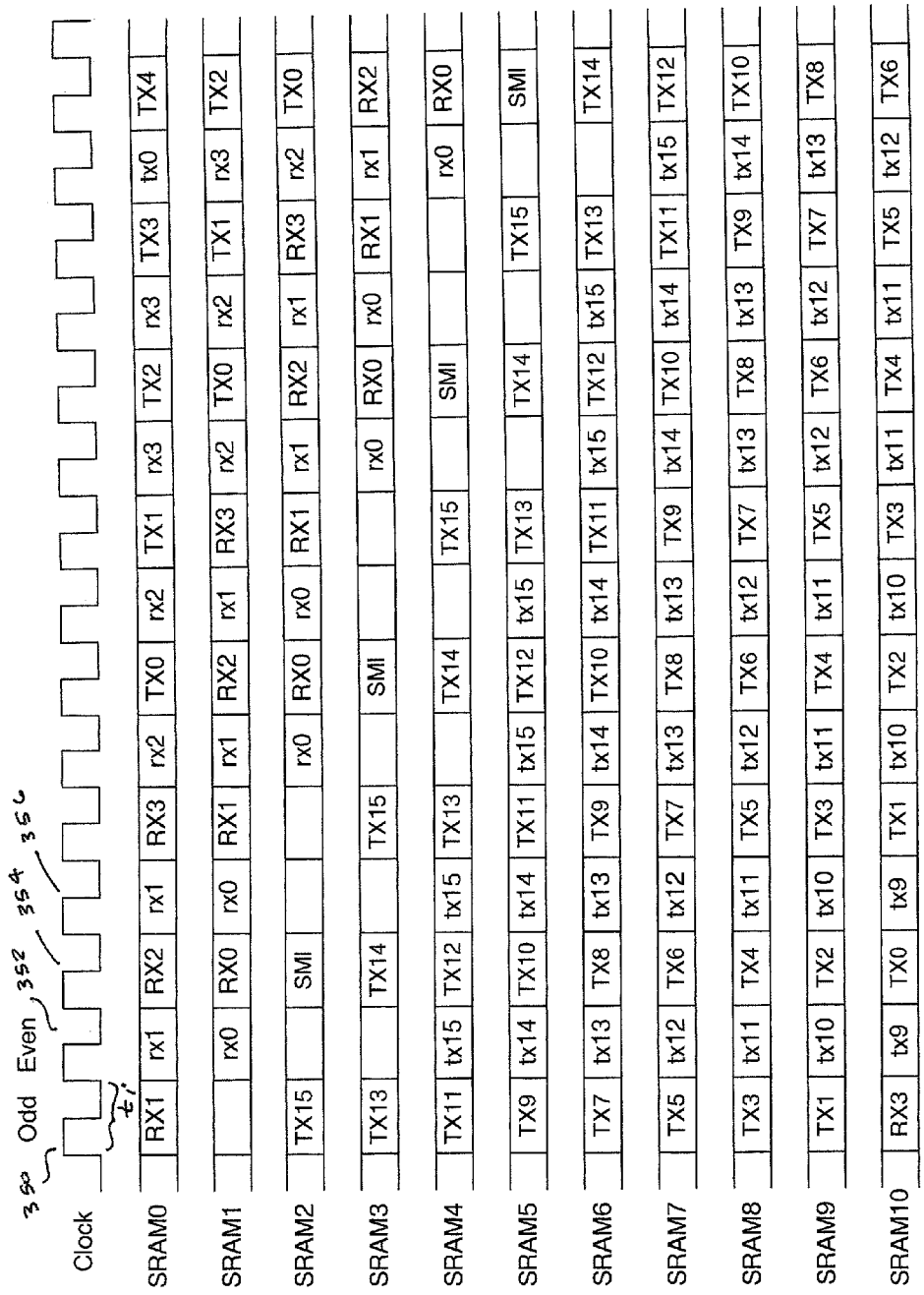
FIG. 4 is a timing diagram showing multiple timeslots allocated to accessing periods of time that results in avoiding timeslot conflicts between two data streams having different rates according to the present invention.

FIG. 4 shows a timing diagram indicating the access rights to the central memory 314 of this first embodiment. A first timeslot 350 is an odd segment, and receiver channel 1 is illustrated as having access to SRAM 0 within an accessing time period $t_i$. The other SRAMs being accessed by the various channels during timeslot 350 are illustrated.

The next timeslot, timeslot 352, is an even segment, so the lower speed ports access the central memory 314 during this segment. In the illustrated embodiment received channel 1 can access SRAM 0 if the channel is in lower speed mode. Timeslot 354 is an odd segment for higher speed ports access and receiver channel 2 is shown as accessing SRAM 0. Timeslot 356 is an even segment and receiver channel 1 is again shown accessing SRAM 0. This double access period in lower speed mode occurs as stated above because the data is arriving slower. The actual data can be stored during either timeslot 352 or 356, with the remaining data from that channel being storing in the other SRAMs during the same first or second cycle of the even segments.

Thus data can be properly stored in or retrieved from the central memory 314 at either of the two speeds without conflicts. While only two-speed operation is shown, additional speeds could be incorporated by providing additional segments, each segment advancing at different speeds.

Figure 5:
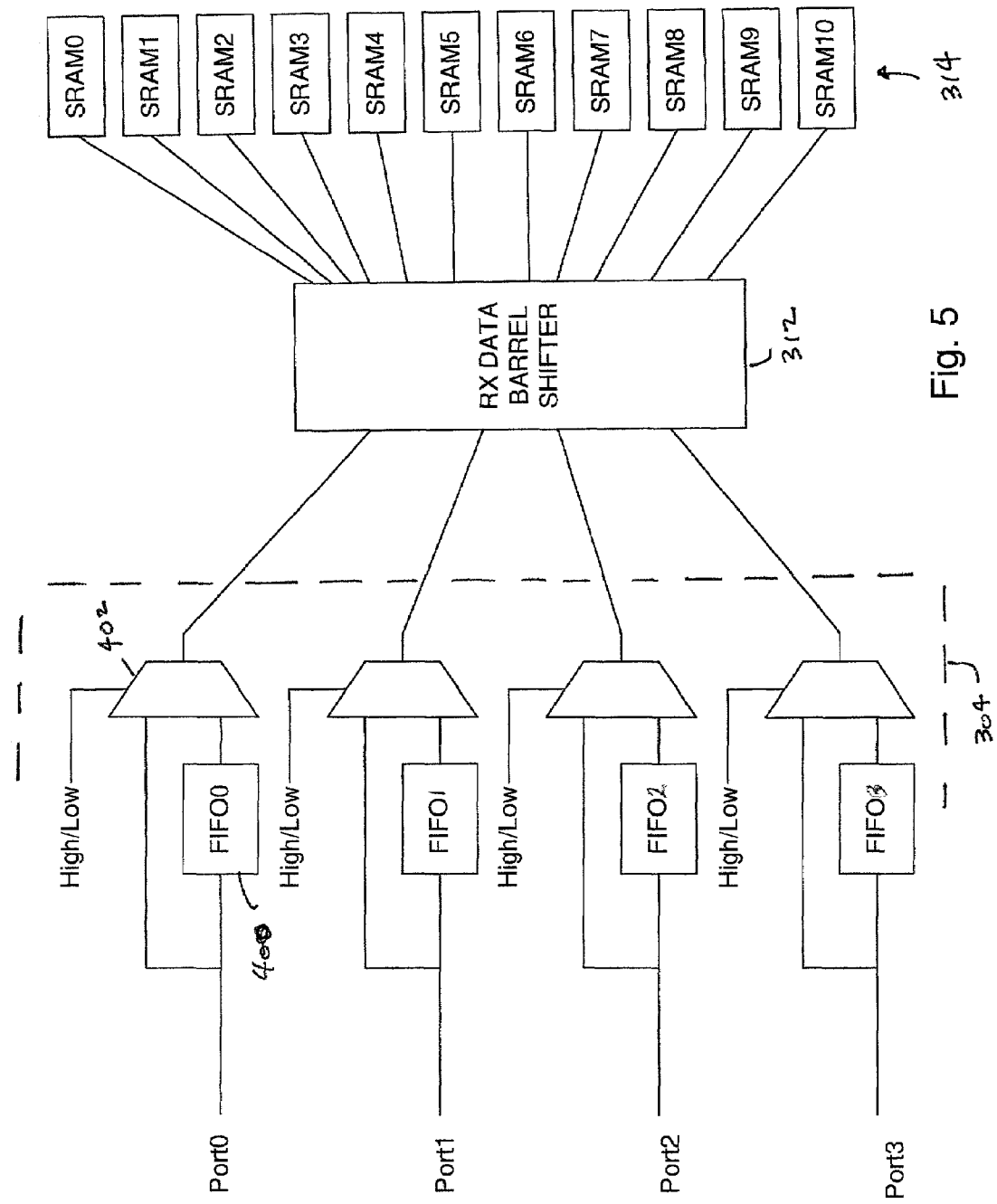
FIG. 5 is a block diagram of portions of the receiver/transmitter logic of FIG. 3 of a second embodiment of a central memory architecture that equalizes data rates prior to writing data streams into the memory modules by using a FIFO.

Referring now to FIG. 5, portions of the receiver/transmitter logic 304 are shown to illustrate a second embodiment to receive data streams at multiple speeds. This is a simplified block diagram and many detailed portions have been omitted for clarity. A received data stream is provided from port 0 to a FIFO 400. The FIFO 400 is provided for speed matching purposes. The input data stream is also provided to a first input of a multiplexer 402. The output of the FIFO 400 is provided to the second input of the multiplexer 402. The selection of the multiplexer 402 input channel is controlled by a HIGH/LOW signal to indicate whether the data stream is a high speed or a low speed data stream. If it is a high speed data stream, the data stream bypasses the FIFO 400 using the multiplexer 402 and is provided directly from the multiplexer 402 to the receive data barrel shifter 312. However, if a low speed data stream is being received, the data proceeds to the FIFO 400 through the multiplexer 402 and then to the receive data barrel shifter 312. In the preferred embodiment the FIFO 400 holds seven 32 bit data words. When the FIFO 400 is full, data is written from the FIFO 400 to the central memory 314 at high speed, the high speed being the speed at which the central memory 314 is operating and is time sliced. Thus the FIFO 400 provides notification to the buffer address timing logic 320 when seven data words have been received so that the FIFO 400 can begin emptying into the central memory 314. While the FIFO 400 is transferring data into the central memory 314, additional data is being received. By the time the FIFO 400 has provided a full round or time slice of data and has addressed all eleven of the SRAMs in the central memory 314, enough additional data will have flowed into the FIFO 400 so that a continuous and full speed operation of writing the eleven words of data received in a full time slice will have occurred, even though the FIFO 400 is only seven words deep. After the eleven operations have been completed, the FIFO 400 stops providing data to the central memory 314 and again proceeds to fill until seven words of data are again received and then the cycle repeats. By the use of the FIFO 400 the data can be provided to the central memory 314 at full speed, i.e., the high speed, in the preferred embodiment 2.125 Gbits/s, even though being received by the port at the lower speed, in the preferred embodiment 1.0625 Gbits/s.

As illustrated in FIG. 5, each port has a similar FIFO and multiplexer in the receiving logic so that the data is properly provided to the receive data barrel shifter 312 and then to the central memory 314 at the high speed, even if the particular port is operating at the lower speed. With this arrangement, each port can individually and independently be running at high speed or low speed.

Figure 6:
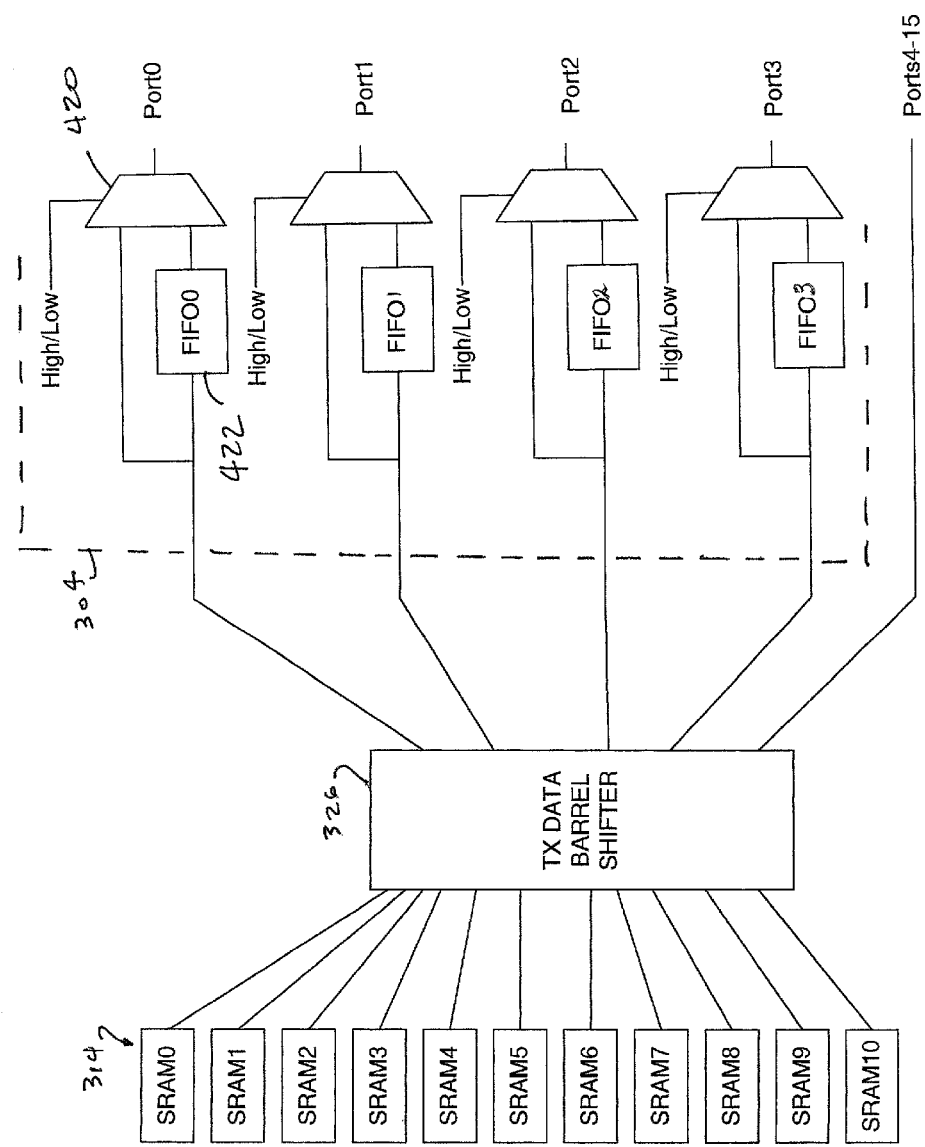
FIG. 6 is a block diagram of portions of the receiver/transmitter logic of FIG. 3 showing the second embodiment of the central memory architecture where a FIFO is used to adjust the rate of data streams prior to transmission onto a network.

FIG. 6 shows the transmitter portion of the received/transmitter logic 304 allowing similar low speed or high speed operation to be selected on a per port basis. In this case an output from the transmit data barrel shifter 326 is provided to a first input of a multiplexer 420 and to a FIFO 422. The output of the FIFO 422 is provided to the second input of the multiplexer 420. The multiplexer output is again similarly controlled by a HIGH/LOW signal so that the high speed data path directly from the transmit data barrel shifter 326 is selected if the port is operating in a high transmit speed and the output from the FIFO 422 is selected if the port is operating at a low transmit speed.

In the preferred embodiment, the transmit FIFO 422 is arranged to hold eight 32-bit words of data. When data is to be transmitted it is received from the central memory 314 into the FIFO 422 and then immediately transmitted out to the multiplexer 420 to the port. If the port is running at low speed, the data will begin to backup in the FIFO 422 but at the rate of data retrieval from the central memory 314 and the transmit rate out of the port, the eight entries in the FIFO 422 are sufficient to provide a full line or full time slice of the central memory 314. After the full time slice or buffer line has been transmitted, the process repeats again, after skipping a full time slice. Thus in this manner each individual port can transmit at high speed by bypassing the FIFO 422, or at low speed using the FIFO 422 even though the access to the central memory 314 is always done at high speed.

Figure 7:
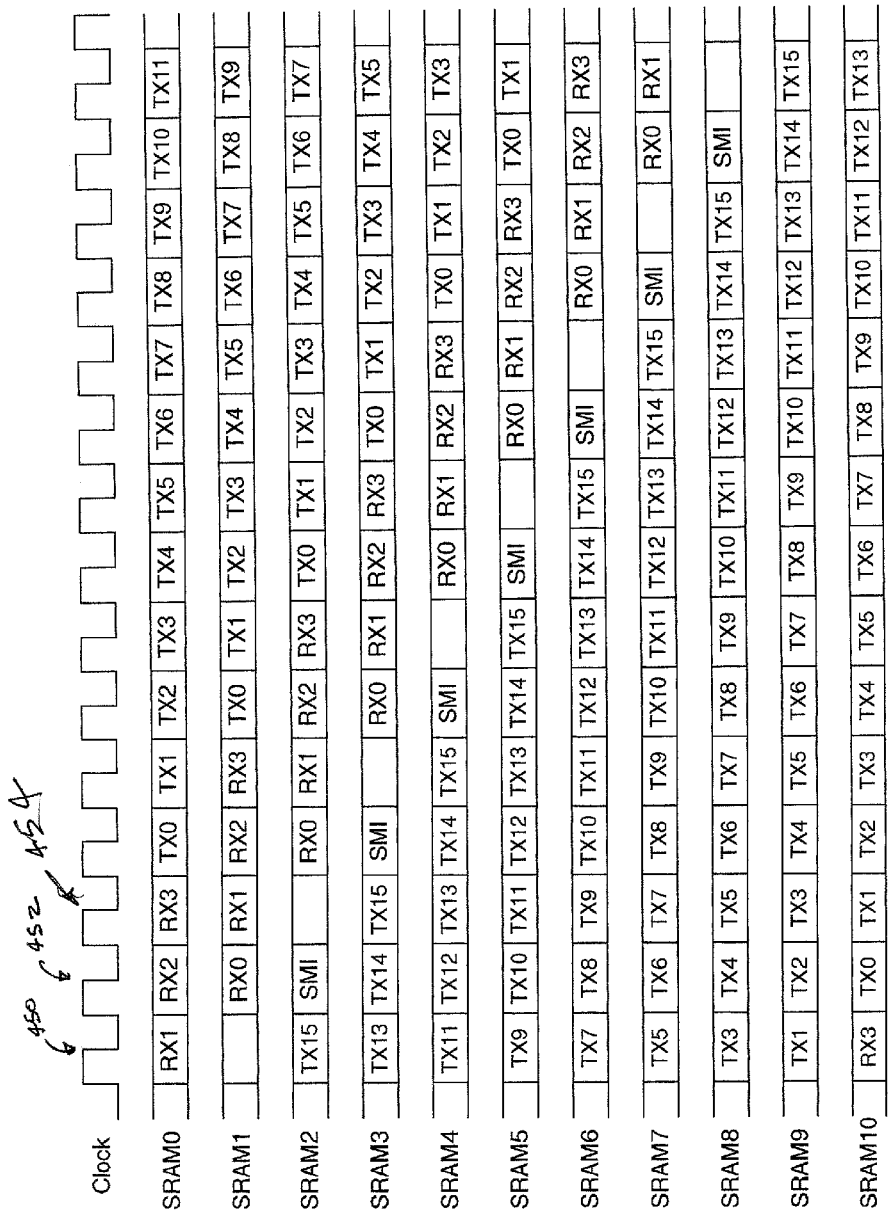
FIG. 7 is a timing diagram showing an example of the possible use of the assigned timeslots by the second embodiment where a FIFO is used to buffer data streams prior to storing or retrieving them.

FIG. 7 illustrates the timing sequencing of the SRAMs and the various receive and transmit portions in the wrapping arrangement. During time slice 450 and with reference to SRAM 0, the receive path from port one has access to the SRAM 0. Then in time slice 452, i.e., the next clock pulse, receive port two has access to SRAM 0. Then in the next time slice 454 in the preferred embodiment, the receive port one has access to SRAM 1. Thus in this manner the data is provided at full speed as the memory is operating at speeds such that the two clocks is the full 2.125 Gbit/s per second transfer rate of the higher speed channel so that the high speed can be continuously provided. As indicated, the FIFOs allow this operation to occur for low speed ports.

As seen from the timing diagram of FIG. 7, this second embodiment is more efficient of memory bandwidth in that two particular time slices are not provided in segments as in the first embodiment and therefore either a higher operational speed can be provided or lower bandwidth memory is required. It is also simpler in this preferred second embodiment to provide for multiple data rates beyond two simply by changing the size of the FIFOs 400 and 422 to be as required, and in the case of the FIFO 400, changing the fill level at which the FIFO 400 begins to transmit data into the central memory 314.

Other variations of the illustrated embodiments could be developed. For example, the number of individual SRAMs could be changed so that each receive and transmit port could have access in the same clock cycle, not in sequential clock cycles as shown. This could provide further increased bandwidth or decrease needed memory speed in exchange for increasing the number of independent memory units. As an alternative to the second embodiment, the high speed paths bypassing the FIFOs could be eliminated, along with the multiplexers. Then in the case of high speed operation of the FIFO 400, the FIFO 400 would simply be configured to begin providing data immediately, without waiting to store any number of words. The transmit FIFO 422 would operate unchanged with data simply not building up in the FIFO 422.

While the present invention has been described with reference to certain embodiments, those skilled in the art will recognize that various modifications may be provided. Variations upon and modifications to the preferred embodiments are provided for by the present invention, which is limited only by the following claims.

What is claimed is:

1. A network switch comprising:
a first port adapted to receive a first data stream at a first rate;
a second port adapted to receive a second data stream at a second rate, where said second rate is not equal to said first rate;
a common central memory, coupled to the second port, adapted to store the first and second data streams and comprising a plurality of memory modules;
a first buffer having an input and output, the input coupled to the first port and the output coupled to the central memory, the first buffer adapted to receive the first data stream at said first rate and transmit the first data stream at said second rate; and
a first timing circuit coupled to the central memory for generating a clock signal used for controlling the storage of the first and second data streams within the central memory.

2. The network switch of claim 1 wherein the network switch operates within a Fibre Channel network.

3. The network switch of claim 1 further comprising a first multiplexer controlled data path having multiple inputs and outputs, a first input coupled to the first port, a second input coupled to the second port, and the multiple outputs coupled to the central memory, the first multiplexer controlled data path adapted to transmit the first and second data streams from the first and second ports to the central memory.

4. The network switch of claim 3 wherein the multiple outputs from the first multiplexer controlled data path are coupled to the central memory in parallel.

5. The network switch of claim 1 wherein the first and second data streams are stored within the central memory by barrel striping across the plurality of memory modules.

6. The network switch of claim 5 wherein a plurality of storage timeslots are created for each memory module within a barrel striping cycle.

7. The network switch of claim 6 wherein the first data stream is striped across the central memory at said first rate and the second data stream is striped across the central memory at said second rate.

8. The network switch of claim 6 wherein each of the plurality of timeslots is created by the timing circuit using an increased clock speed used to time the storage of the first and second data streams.

9. The network switch of claim 1 wherein the first buffer comprises a first-in-first-out buffer.

10. The network switch of claim 1 further comprising a second multiplexer controlled data path having multiple inputs and an output, a first input coupled to the first buffer, a second input coupled to the first port, and the output coupled to the central memory, the second multiplexer controlled data path adapted to transmit the first data stream from the first buffer or the first port to the central memory.

11. The network switch of claim 1 wherein the first and second data streams are striped across the central memory at said second rate.

12. The network switch of claim 1 further comprising:
a third port adapted to transmit the first data stream at said first rate onto a network; and
a fourth port adapted to transmit the second data stream at said second rate onto the network, where said second rate is not equal to said first rate.

13. The network switch of claim 12 wherein the network switch operates within a Fibre Channel network.

14. The network switch of claim 12 further comprising a third multiplexer controlled data path having multiple inputs and outputs, the multiple inputs coupled to the central memory, a first output coupled to the third port, and a second output coupled to the fourth port, the third multiplexer controlled data path adapted to transmit the first and second data streams from the central memory to the third and fourth ports.

15. The network switch of claim 14 wherein the multiple inputs to the third multiplexer controlled data path are coupled to the central memory in parallel.

16. The network switch of claim 14 wherein the first and second data streams are retrieved from the central memory by striping across the plurality of memory modules.

17. The network switch of claim 16 wherein the first data stream is retrieved and transmitted to the third port at said first rate and the second data stream is retrieved at said second rate and transmitted to the fourth port, said first rate not being equal to said second rate.

18. The network switch of claim 14 further comprising a second timing circuit coupled to the central memory, the second timing circuit adapted to time the retrieval of the first and second data streams stored in the central memory.

19. The network switch of claim 14 further comprising a third buffer having an input and an output, the input coupled to the central memory and the output coupled to the third multiplexer controlled data path, the third buffer adapted to data retrieved from the central memory.

20. The network switch of claim 19 wherein the third buffer is coupled directly to one of the plurality of memory modules.

21. The network switch of claim 20 wherein the first and second data streams are retrieved from the central memory by striping across the plurality of memory modules.

22. A network switch comprising:
a first port adapted to receive a first data stream at a first rate;
a second port adapted to receive a second data stream at a second rate, where said second rate is not equal to said first rate;
a common central memory, coupled to the first and second ports, adapted to store the first and second data streams and comprising a plurality of memory modules;
a first timing circuit coupled to the central memory for generating a clock signal used for controlling the storage of the first and second data streams within the central memory;
a third port adapted to transmit the first data stream at said first rate onto a network;
a buffer having an input and an output, the input coupled to the central memory and the output coupled to the third port, the buffer adapted to receive the first data stream at said second rate and transmit the first data stream at said first rate; and
a fourth port, coupled to the central memory, adapted to transmit the second data stream at said second rate onto the network.

23. The network switch of claim 22 wherein the buffer comprises a first-in-first-out buffer.

24. The network switch of claim 22 wherein the first and second data streams are retrieved from the central memory by barrel striping across the plurality of memory modules.

25. The network switch of claim 22 wherein the first data stream is transmitted from the buffer to the third port at said first rate.

26. A method for storing multiple data streams within a network switch, the method comprising:
receiving a first data stream in a first port at a first rate;
receiving a second data stream in a second port at a second rate, where said second rate is not equal to said first rate;
storing the first and second data streams within a common central memory, the central memory comprising a plurality of memory modules;
controlling the storage of the first and second data streams in the central memory using a first clock signal;
transmitting the first data stream from the first port into a first buffer at said first rate;
storing the first data stream within the buffer;
transmitting the first data stream from the first buffer into the central memory at said second rate; and
storing the first data stream within the plurality of memory modules in the central memory at said second rate.

27. The method of claim 26 wherein the network switch operates within a Fibre Channel network.

28. The method of claim 26 further comprising:
transmitting the first data stream from the first port to the plurality of memory modules using a first multiplexer controlled data path; and
transmitting the second data stream from the second port to the plurality of memory modules using the first multiplexer controlled data path.

29. The method of claim 28 wherein the first data stream and second data stream are transmitted to the plurality of memory modules in parallel.

30. The method of claim 26 wherein the first and second data streams are stored in the central memory by barrel striping across the plurality of memory modules.

31. The method of claim 30 further comprising the step of creating a plurality of storage timeslots for each memory module within a barrel striping cycle.

32. The method of claim 31 further comprising:
  striping the first data stream across the plurality of memory modules in the central memory at said first rate; and
  striping the second data stream across the plurality of memory modules in the central memory at said second rate.

33. The method of claim 31 wherein each plurality of timeslots is created by a timing circuit using an increased clock speed used to control the storage of the first and second data streams within the central memory.

34. The method of claim 26 wherein the first buffer comprises a first-in-first-out buffer.

35. The method of claim 26 further comprising:
  transmitting the first data stream from the first buffer to the plurality of memory modules using a second multiplexer controlled data path; and
  transmitting the first data stream from the first port to the plurality of memory modules using the second multiplexer controlled data path.

36. The method of claim 35 wherein the first data stream and second data stream are transmitted to the plurality of memory modules in parallel.

37. The method of claim 35 wherein the first and second data streams are striped across the plurality of memory modules at said second rate.

38. The method of claim 26 further comprising:
  transmitting the first data stream from the central memory to a third port;
  transmitting the first data stream from the third port onto a network at said first rate;
  transmitting the second data stream from the central memory to a fourth port; and
  transmitting the second data stream from the fourth port onto a network at said second rate, where said second rate is not equal to said first rate.

39. The method of 38 wherein the network switch operates within a Fibre Channel network.

40. The method of claim 38 further comprising:
  retrieving the first data stream from the plurality of memory modules;
  transmitting the first data stream from the central memory to the third port using a second multiplexer controlled data path;
  retrieving the second data stream from the plurality of memory modules; and
  transmitting the second data stream from the central memory to the fourth port using the second multiplexer controlled data path.

41. The method of claim 40 wherein the first data stream and second data stream are retrieved from the plurality of memory modules in parallel.

42. The method of claim 40 wherein the first and second data streams are retrieved from the central memory by striping across the plurality of memory modules.

43. The method of claim 42 wherein the first data stream is retrieved from the central memory at said first rate and the second data stream is retrieved from the central memory at said second rate.

44. The method of claim 38 wherein the first clock signal times the retrieval of the first and second data streams stored in the central memory.

45. A method for storing multiple data streams within a network switch, the method comprising:
  receiving a first data stream in a first port at a first rate;
  receiving a second data stream in a second port at a second rate, where said second rate is not equal to said first rate;
  storing the first and second data streams within a common central memory, the central memory comprising a plurality of memory modules; and
  controlling the storage of the first and second data streams in the central memory using a first clock signal;
  receiving the first data stream at said second rate from the central memory into a second buffer;
  transmitting the first data stream at said first rate from the second buffer to a third port;
  transmitting the first data stream from the third port onto a network at said first rate;
  transmitting the second data stream from the central memory to a fourth port; and
  transmitting the second data stream from the fourth port onto a network at said second rate.

46. The method of claim 45 wherein the second buffer comprises a first-in-first-out buffer.

47. The method of claim 45 wherein the first and second data streams are retrieved from the central memory by barrel striping across the plurality of memory modules.

* * * * *